United States Patent
Jin et al.

(10) Patent No.: US 10,102,662 B2
(45) Date of Patent: Oct. 16, 2018

(54) PRIMITIVE CULLING USING AUTOMATICALLY COMPILED COMPUTE SHADERS

(71) Applicant: Advanced Micro Devices, Inc., Sunnyvale, CA (US)

(72) Inventors: Guohua Jin, Boxborough, MA (US); Qun Lin, Shanghai (CN); Benedikt Kessler, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 69 days.

(21) Appl. No.: 15/221,431

(22) Filed: Jul. 27, 2016

(65) Prior Publication Data

US 2018/0033184 A1    Feb. 1, 2018

(51) Int. Cl.
*G06T 15/00*    (2011.01)
*G06T 15/80*    (2011.01)
*G06T 15/40*    (2011.01)

(52) U.S. Cl.
CPC ............ *G06T 15/005* (2013.01); *G06T 15/40* (2013.01); *G06T 15/80* (2013.01)

(58) Field of Classification Search
None
See application file for complete search history.

(56) References Cited

U.S. PATENT DOCUMENTS 7,468,726 B1  12/2008  Wloka et al.
8,542,247 B1   9/2013  Hakura et al.
9,038,034 B2   5/2015  Akenine-Moller et al.
2010/0060630 A1  3/2010  Nystad et al.
2010/0097377 A1  4/2010  Hasselgren et al.
(Continued)

FOREIGN PATENT DOCUMENTS

WO    2006044963 A1    4/2006

OTHER PUBLICATIONS

GPUOPEN, "GeometryFX", available at: http://gpuopen.com/gaming-product/geometryfx/, 2016 (Retrieved Jul. 26, 2016).
(Continued)

*Primary Examiner* — Vu Nguyen
(74) *Attorney, Agent, or Firm* — Volpe and Koenig, P.C.

(57) ABSTRACT

Techniques for culling primitives are provided herein. The techniques involve automatic generation of shader programs to be executed by an accelerated processing device. A just-in-time compiler automatically generates the shader programs based on a vertex shader program that is provided for use in the vertex shader stage of the graphics processing pipeline. The automatically generated shader programs include instructions from the vertex shader program that transform the positions of vertices provided as input to the graphics processing pipeline to generate transformed input vertices. The shader programs also include instructions to cull primitives based on the transformed input vertices. After generating the automatically generated shader programs, the software module transmits the automatically generated shader programs to the graphics processing pipeline for execution. After culling primitives, the automatically generated shader programs output culled primitives to the remainder of the graphics processing pipeline.

20 Claims, 6 Drawing Sheets

(56) References Cited

U.S. PATENT DOCUMENTS

2011/0102437 A1    5/2011  Akenine-Moller et al.
2014/0362081 A1   12/2014  Cerny et al.
2014/0362102 A1   12/2014  Cerny et al.
2015/0054827 A1    2/2015  Hakura et al.
2017/0323475 A1*  11/2017  Moreton ................. G06T 15/80

OTHER PUBLICATIONS

Wihlidal, Graham, "Optimizing the Graphics Pipeline with Compute", Game Developers Conference, Mar. 14-18, 2016, San Francisco, CA. U.S.A., available at: http://www.wihlidal.ca/Presentations/GDC_2016_Compute.pdf (Retrieved Jul. 26, 2016).

* cited by examiner

PRIMITIVE CULLING USING AUTOMATICALLY COMPILED COMPUTE SHADERS

TECHNICAL FIELD

The disclosed embodiments are generally directed to graphics processing pipelines, and in particular, to primitive culling using automatically compiled compute shaders.

BACKGROUND

Three-dimensional graphics processing pipelines accept commands from a host (such as a central processing unit of a computing system) and process those commands to generate pixels for display on a display device. The commands may specify primitive elements ("primitives"), such as geometric shapes to be drawn. The graphics processing pipeline processes these primitives elements to generate transformed primitives elements (e.g., via a vertex shader), and then processes the transformed primitive elements (e.g., via a pixel shader) to generate pixels for output to the screen. At various stages in the graphics processing pipeline, culling operations may be performed to remove elements for which processing is not desired (e.g., because the elements would have no effect on the resulting image). In one example, primitives are culled before arrival at a pixel shader to reduce the amount of work that needs to be performed by the pixel shader. Efficiently implementing culling operations is important to operation of the graphics processing pipeline.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for culling primitives to be provided to a graphics processing pipeline for processing. The techniques involve automatic generation of shader programs to be executed by an accelerated processing device (e.g., a graphics card or integrated graphics circuitry). The shader programs, when executed by the accelerated processing device, cull primitives that are to be processed by the graphics processing pipeline.

A software module, such as a just-in-time compiler component of a driver being executed by a host CPU, automatically generates the shader programs based on a vertex shader program that is provided for use in the vertex shader stage of the graphics processing pipeline. As is generally known, the vertex shader stage of the graphics processing pipeline may involve execution of a vertex shader program to transform vertex coordinates and to modify or generate other attributes of the vertices as needed. Vertex shader programs are often embedded within application programs for transmittal to and execution by the graphics processing pipeline, to process primitives received from the host CPU. The automatically generated shader programs include instructions from the vertex shader program that transform the positions of vertices provided as input to the graphics processing pipeline to generate transformed input vertices. The shader programs also include instructions to cull primitives based on the transformed input vertices. The shader programs do not, however, include instructions for transforming or generating non-position attributes of input vertices, because the output of these instructions are not used by the culling instructions.

After generating the automatically generated shader programs, the software module transmits the automatically generated shader programs to the graphics processing pipeline for execution. These shader programs process primitives received from the host CPU for processing by the graphics processing pipeline and thus act as a sort of "front end filter" for the graphics pipeline. After culling primitives, the automatically generated shader programs output culled primitives to the remainder of the graphics processing pipeline. The graphics processing pipeline thus avoids processing primitives that are culled by the shader programs, reducing the amount of work to be performed by the graphics processing pipeline and improving performance of the graphics processing pipeline.

Figure 1:
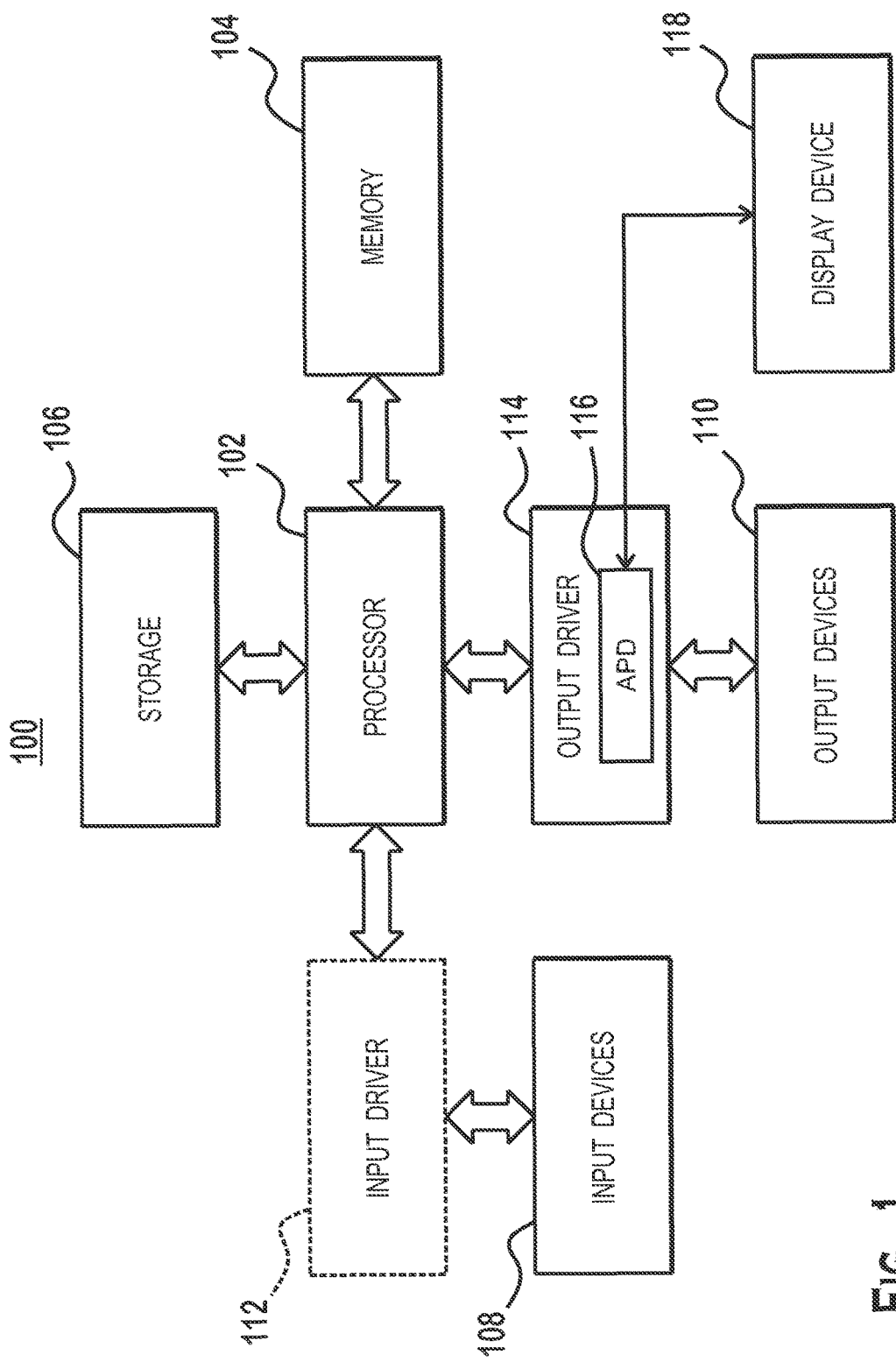
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
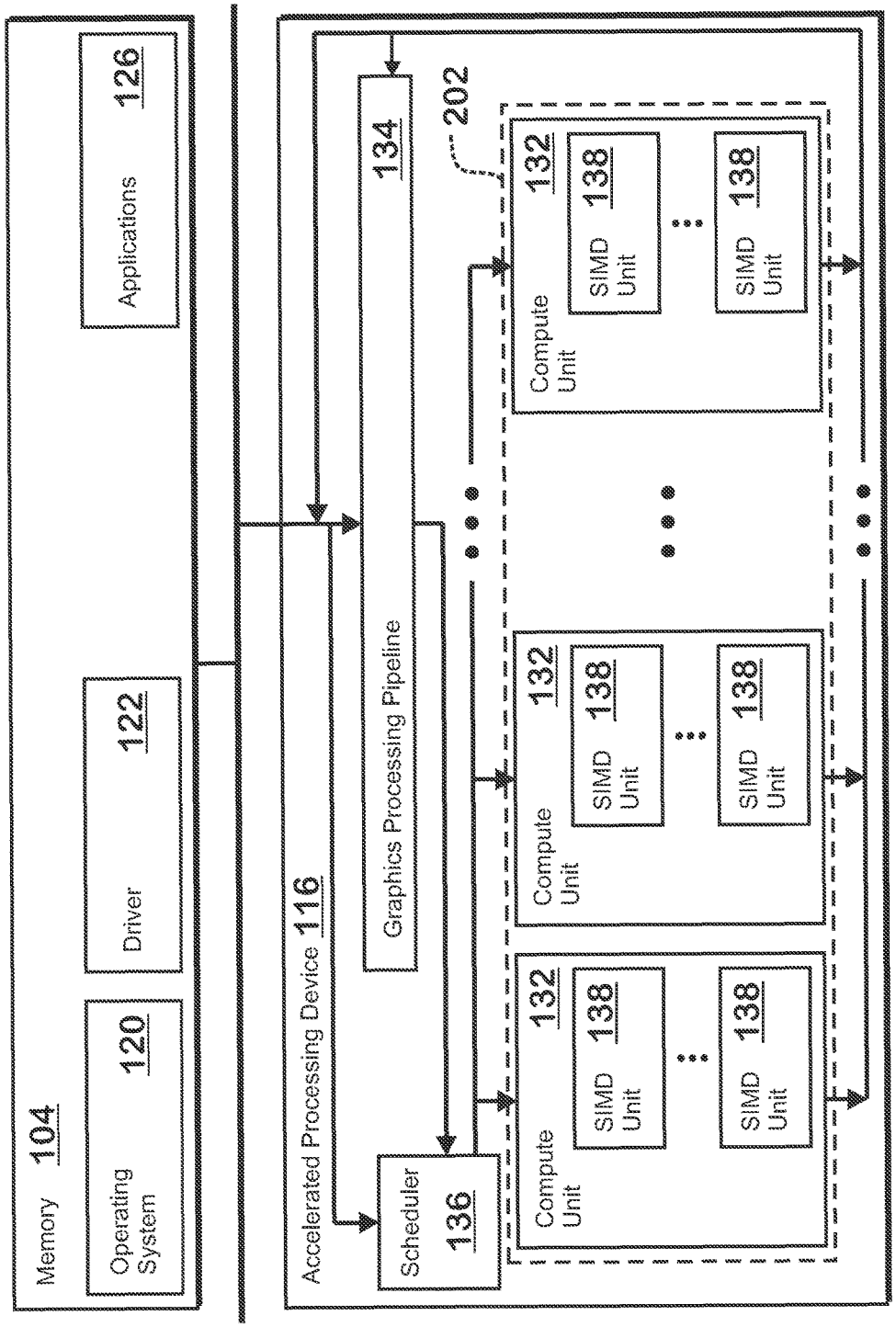
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes compute units 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 3:
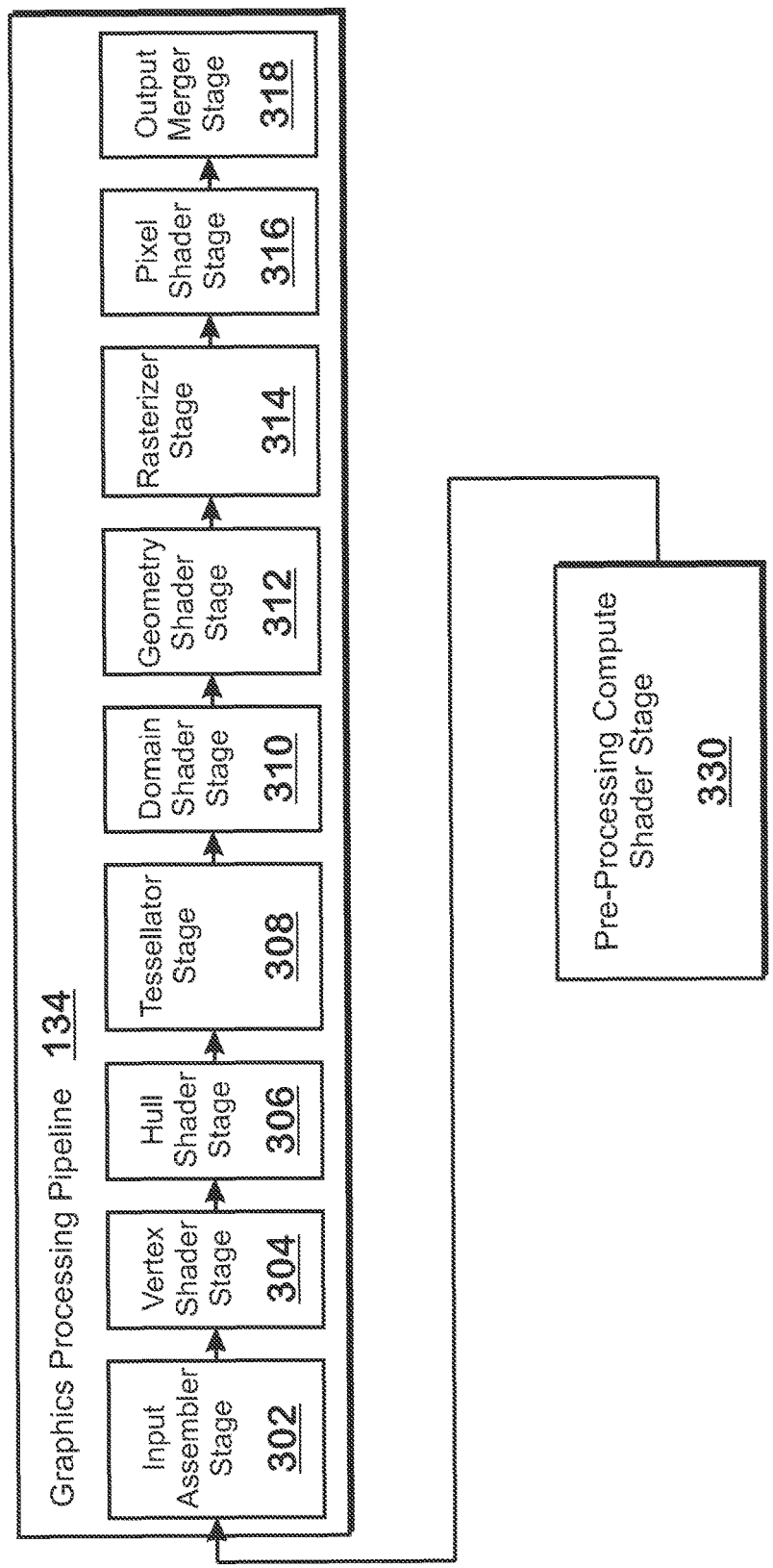
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transforms are considered to modify the coordinates or "position" of the vertices on which the transforms are performed. Other operations of the vertex shader stage 304 that modify attributes other than the coordinates are considered to modify non-position attributes.

The vertex shader stage 304 is implemented partially or fully as vertex shader programs to be executed on one or more compute units 132. The vertex shader programs are provided by the processor 102 as programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

A pre-processing compute shader stage 330 is coupled to the graphics processing pipeline 134. The pre-processing compute shader stage 330 allows computational work to be performed on primitives received from outside of the APD 116 (e.g., from the processor 102) before being processed by the graphics processing pipeline 134. The pre-processing compute shader stage 330 executes pre-processing compute shader programs received from, for example, the processor 102. These pre-processing compute shader programs accept specified inputs, such as primitives or vertices, and produce specified outputs, such as modified primitives or vertices.

One use for the pre-processing compute shader stage 330 is to perform culling. Culling involves removing elements that will not significantly impact the final rendered scene. Elements outside of the view frustum (i.e., the 3D portion of space that can be viewed by the view camera for which rendering is being performed) are removed in a process referred to as frustum culling. Elements that are invisible to the camera because the "back" face of such elements face the camera are removed in a process referred to as "back-face culling." Elements that are blocked or "occluded" by other elements and are therefore not visible in the rendered scene are removed in a process referred to as occlusion culling. Elements that are too small to be visible in the rendered scene (e.g., primitives that are so small that the primitives do not "cover" any pixel sample) are removed in a process referred to as small primitive culling. Other types of culling operations are known in the art as well. The pre-processing computer shader stage 330 operates in an "asynchronous" manner with respect to the rest of the graphics processing pipeline 134, in that the graphics processing pipeline 134 can process data (e.g., culled primitives) as soon as such processed data has been processed by the compute shader stage 330.

Such culling operations are be performed by a stage of the graphics processing pipeline 134. In one technique, culling is performed after the vertex shader stage 304 because the transformed vertex positions obtained during the vertex shader stage 304 are necessary to determine whether elements are visible in the rendered scene. However, such a technique may result in reduced processing efficiency of the graphics processing pipeline 134 because data related to primitives that are not rendered in the final scene would be processed by certain stages of the graphics processing pipeline 134.

In another technique, the pre-processing compute shader stage 330 performs at least some culling operations that would otherwise be performed by the graphics processing pipeline 134. The benefit of such a technique is that the number of primitives that travel through and are processed by the graphics processing pipeline 134 is reduced. However, one difficulty with this technique is that operations for calculating the vertex transforms to determine transformed vertex positions necessary for performing the culling operations are not performed until the vertex shader stage 304.

To alleviate this difficulty, the driver 122, which generates compiled shader programs (such as vertex shader programs) from shader programs received from other software being executed by the processor 102, is configured to automatically generate shader programs for culling based on the vertex shader programs received from the other software. In one example, an application 126 provides vertex shader programs that include instructions for, among other things, transforming the position of vertices received by the vertex shader stage 304 of the graphics processing pipeline 134. Such vertex shader programs also define instructions for performing operations to modify or generate non-position attributes for vertices, such as values that define vertex lighting, color, texture coordinates, or any other aspect of vertices that do not define position of the vertices within rendering space.

Figure 4:
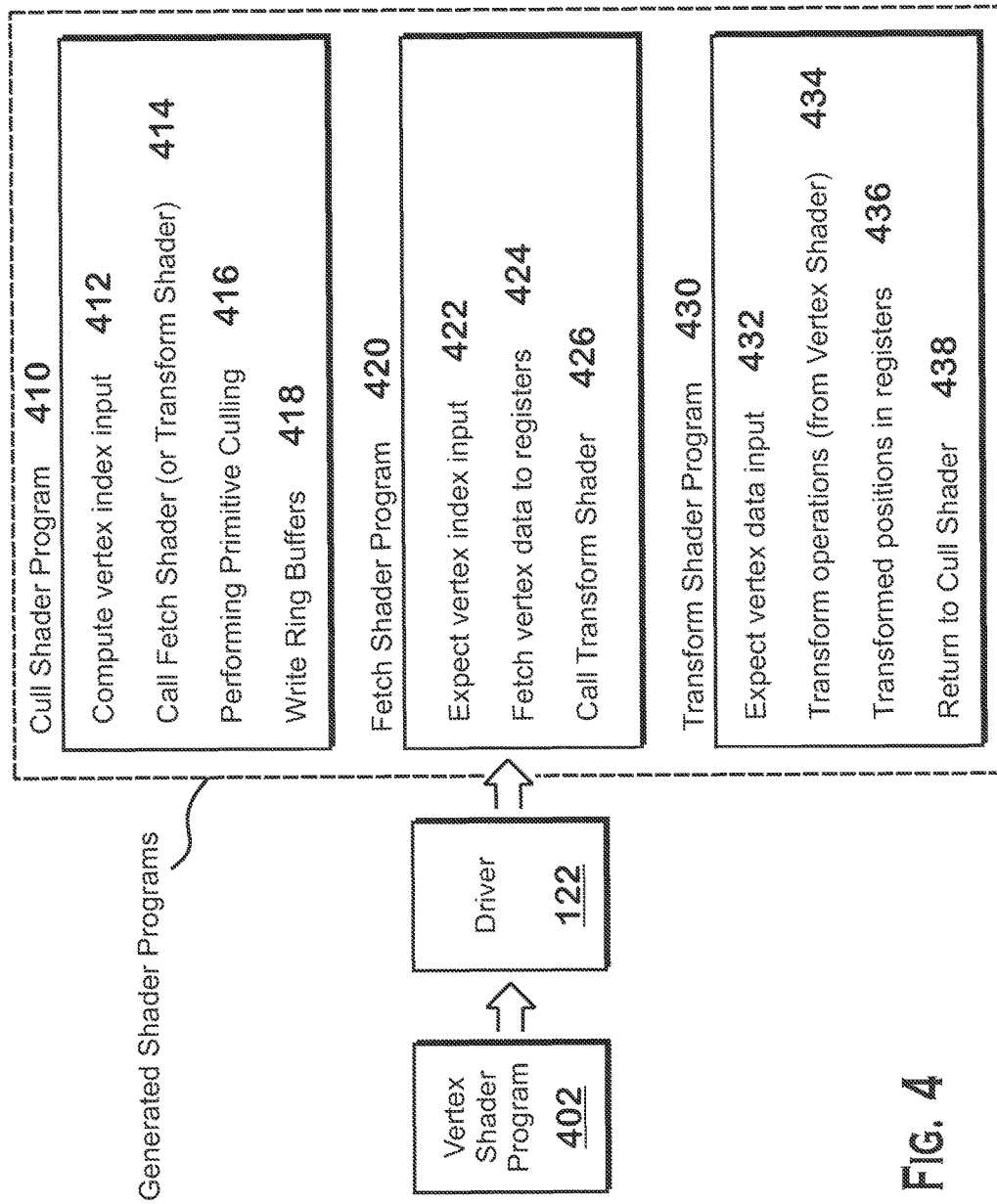
FIG. 4 is a block diagram that illustrates automatically generated compute shaders for pre-graphics-pipeline culling.

FIG. 4 is a block diagram that illustrates automatically generated compute shaders for pre-graphics-pipeline culling. The driver 122 generates a cull shader program 410 and a transform shader program 430, and, optionally, a fetch shader program 420, based on a vertex shader program 402 that is provided to the driver 122 for execution at the vertex shader stage 304.

The cull shader program 410, optional fetch shader program 420, and transform shader program 430 include instructions for performing the position transforms of the provided vertex shader program 402 and for culling primitives based on the vertices transformed by such position transforms. The cull shader program 410 acts as a "main" shader program, calling the fetch shader program 420 or transform shader program 430 to perform subordinate functionality as indicated herein. The shader programs of FIG. 4 are illustrated with pseudocode "instructions" that describe functionality in descriptive terms. It should be understood that different shader program implementations could use various combinations of machine language instructions to implement the functionality described herein.

The cull shader program 410 includes a compute vertex index input instruction 412. The compute vertex index input instruction 412 computes the inputs used and passed by the cull shader program 410 to the fetch shader program 420 if used or the transform shader program 430, based on the number of vertices to be processed by the fetch shader program 420 and the transform shader program 430 and the work-item identifier and work-group identifier. More specifically, because multiple instances of the cull shader program 410 can execute in parallel on the massively parallel architecture shown in FIG. 2, each instance is assigned a particular set of input resources (such as registers, memory space, and the like) that does not overlap with input resources for other instances. To identify resources for use by a particular shader program, the driver 122 adds the compute vertex index input instruction 412, which computationally identifies a specific set of input resources in which vertex indices for vertices to be processed by the fetch shader program 420 (or transform shader program 430 if no fetch shader program 420 is used) are placed. The identification of these resources is based on values that specifically identify the instance of the shader program, such as the work-item identifier and work-group identifier.

After the compute vertex index input instruction 412, the cull shader program 410 includes an instruction that calls the fetch shader program 420 if a fetch shader program is used or alternatively an instruction that directly calls the transform shader program 430 if there is no independent fetch shader program 420. Fetch shaders are useful when the driver 122 "knows" that buffers storing data that are input to the transform shader may be dynamically reconfigured. Having a separate fetch shader allows the driver 122 to modify only the fetch shader and not modify the transform shader in response to reconfiguring such buffers. The fetch shader program 420 (if present) and transform shader program 430 accept the vertex index input, fetch vertex data based on the vertex indices, and transform the vertex data according to position transforms derived from a corresponding vertex shader program as described above.

After execution of the transform shader program 430 and optional fetch shader program 420, execution returns to the instructions after the call fetch shader instruction 414. These subsequent instructions are the perform primitive culling instructions 416. The primitive culling instructions 416 may be inserted by the driver 122 from a set of pre-defined primitive culling instructions stored in memory 104 and/or storage 106 of the device 100 or may be specified by the application 126 that specified the vertex shader program 402. The primitive culling instructions 416 implement any one or more culling techniques such as the ones described herein (e.g., back face culling, frustum culling, occlusion culling, small primitive culling, and the like). Instructions for performing primitive culling are well known and will not be described herein in detail.

After the primitive culling instructions 416, the cull shader program 410 performs write ring buffers instructions 418. The ring buffers referred to herein are buffers that include vertex data and indices for consumption by the graphics processing pipeline 134. Without the automatically generated shader programs illustrated in FIG. 4, these ring buffers would include all primitives requested to be rendered by the processor 102 (or some other entity). Thus, in that scenario, the graphics processing pipeline 134 would at least partially process all such primitives even if such primitives would not contribute to the final scene. By writing only the culled output (e.g., the vertex data and indices that survived the culling process) to such ring buffers, the graphics processing pipeline 134 avoids processing for primitives identified as being culled by the cull shader program 410 and subordinate functionality.

The fetch shader program 420 and transform shader program 430 are now described in more detail. Upon calling the fetch shader program 420, the fetch shader program 420 executes. The purpose of the fetch shader program 420 is to fetch vertex data based on vertex indices and to place the vertex data into registers for use by the transform shader program 430. The fetch shader program 420 includes an expect vertex index input label 422 that tells the hardware where (e.g., in what registers) to expect vertex index input, a fetch vertex data to registers instruction 424 that fetches vertex data to registers based on the vertex index input, and an instruction to call the transform shader 426. The expect vertex index input label 422 simply describes what resources store the inputs to the fetch shader program 420. Such resources include, for example, registers, and may be the same registers as computed in the compute vertex index input instruction 412 of the cull shader program 410. The fetch vertex data to registers instruction 424 retrieves vertex data from vertex buffers based on the vertex indices indicated in the registers identified by the expect vertex index input label 422 and places the retrieved vertex data into registers for processing by the transform shader program 430. Note that the expect vertex index input label 422 may be included within the fetch vertex data to registers instruction 424 (e.g. as a notation to an operand of the instruction 424). Vertex indices are a mechanism that allows vertex data to be referenced by a single compact data structure (the index) in order to prevent duplicate storage of vertex data before the vertex data is actually fetched by the fetch shader. After the fetch vertex data to registers instruction 424, the fetch shader program 420 includes a call transform shader instruction 426, which invokes the transform shader program 430.

The transform shader program 430 includes a label that indicates where to expect vertex data input 432, transform operation instructions 434, instructions to put the transformed positions into registers for use by the remainder of the cull shader program 410, and an instruction to return execution to the cull shader 438. If no fetch shader is used, the transform shader program 430 would also include the expect vertex index input label 422 and the fetch vertex data to registers instruction 424 from the fetch shader program 420. The expect vertex data input label 432, the transform operations instructions 434, and the transformed positions in registers instructions 436 are derived from the vertex shader program 402 provided to the driver 122.

The expect vertex data input label 432 indicates where (such as in which registers, memory locations, or the like) the inputs to the transform shader program 430 are expected to be and are included within the transform operations 434 (e.g., as an operand notation to one or more instructions). The transform operations 434 are operations that when executed, transform the positions of the vertex data input to the transform shader program 430, in accordance with the vertex shader program from which the transform operations 434 are derived. The transformed positions in registers instruction 436 places the results of the transform operations 434 into certain registers for use by the cull shader program 410. The return to cull shader instruction 438 returns execution to the cull shader program 410, at the instruction immediately after the call fetch shader instruction 414 (or call transform shader instruction if no fetch shader program is used).

The driver 122 generates the instructions of the transform shader program 430, such as the transform operations 434, based on the vertex shader program 402, by eliminating instructions of the vertex shader program 402 that contribute only to non-position attributes of vertices. To eliminate such instructions, the driver 122 uses a technique such as dead code elimination. Dead code elimination is a technique in which instructions that do not lead to a useful result are eliminated. Many techniques for performing dead code elimination are known and the driver 122 may use any such technique in analyzing the vertex shader program 402 as discussed herein.

To apply the dead code elimination technique to eliminate the above-mentioned instructions that do not correspond to transformed vertex positions, the driver 122 first locates all instructions that define non-transformed vertex position output for the vertex shader program 402 and marks such instructions as dead code. Such output instructions are commonly included in vertex shader programs in a known format. Thus the driver 122 is able to identify such instructions.

After marking such instructions as dead code, the driver 122 applies the dead code elimination techniques. Because the above output instructions are marked as dead, the driver 122 would know that any instructions that only contribute to the results output by the above output instructions are also dead code. The driver 122 tracks backwards through the vertex shader program 402 to identify all instructions that only contribute to instructions already marked as dead code and mark such newly found instructions as dead code. After finding all instructions that are to be marked as dead code, the driver 122 eliminates the marked instructions and includes the remaining instructions in the transform shader program 430. These remaining instructions would constitute the transform operations 434. The driver 122 applies similar dead code elimination techniques to generate the fetch shader program 420, if that shader program exists, to remove instructions that do not contribute to fetching vertex positions.

Any of the buffers described herein are located in any appropriate memory location, including memory located in and/or assigned to the APD 116 or within system memory 104. Such buffers include, for example, the ring buffers written to by the write ring buffers instruction 418, ring buffers in which vertex data and vertex index data are stored, as well as other buffers described herein.

Note that the actual vertex shader program 402 that is executed at the vertex shader stage 304 is not deleted or replaced but is still executed at that stage. In some alternatives, the vertex shader program 402 is modified to receive inputs from the outputs of the automatically generated shader programs, and/or in line with other modifications described herein such as to use transformed vertex positions generated by the automatically generated shader programs. Note also that the call instructions described above (e.g., call fetch shader instruction 414, call transform shader instruction 426, and return to cull shader instruction 438) may be implemented simply with instructions that directly set the program counter, to avoid the overhead associated with function calls or the like.

In one approach, the driver 122 generates the automatically generated shader programs in a specific order, for efficiency. More specifically, the driver 122 first generates the transform shader program 430, then the fetch shader program 420 if present, and then the cull shader program 410. The reason that the driver 122 generates the transform shader program 430 first is that determining what resources (e.g., registers, memory, and the like) are needed for execution of the transform shader program 430 also informs the determination of what resources are needed for execution of the fetch shader program 420 and the cull shader program 410.

For example, the expect vertex data input label 432 of the transform shader program 430 specifies specific registers in which the vertex data is stored. After generating the transform shader program 430, which includes this label, the driver 122 generates the fetch shader program, which includes the fetch vertex data to registers instruction 424. Because the driver 122 "knows" that the vertex data is to be used by the transform shader program 430 and "knows" which registers the transform shader program 430 expects that data to be in, the driver 122 can write the fetch vertex data to registers instruction 424 to specify that the vertex data is to be written to the registers specified in the expect vertex data input label 432. Writing the fetch vertex data to registers instruction 424 in this manner avoids any sort of copying that might be necessary between output registers of a fetch shader program and input registers of a transform shader program. In a similar manner, the driver 122 writes the expect vertex index input label 422 of the fetch shader program to specify the same registers as the compute vertex index input instruction 412 of the cull shader program 410, "knowing" that the data in these registers will not change between the time that the cull shader program 410 stores the vertex index and the time the fetch shader program 420 needs to read the vertex index input.

In another optimization, registers or other resources that are no longer needed are be "reclaimed" for use by other operations, to reduce the total resource footprint of the automatically generated shader programs. For example, because the registers that store the vertex index input are not needed after the vertex data is fetched, the vertex data are be placed into at least some of the registers in which the vertex index input was stored.

In yet another optimization, the driver 122 generates the shader programs to support short-length data pointers. More specifically, shader programs use data pointers to refer to portions of memory that store data to be used by such shader programs. Such data pointers are stored in registers used by the shader programs. To reduce the amount of register space needed for data pointers, the driver 122 generates the shader programs such that the registers are sized to only store least significant bits of the address of the data pointers rather than the full address. The driver 122 then generates each of the instructions of the shader programs to fill in the missing most significant bits whenever the data referred to by the data pointers are accessed. The purpose of this optimization is to reduce the total register footprint (e.g., total amount of register file space needed) of the shader programs, thereby freeing up register resources for other potential uses.

In addition to generating the shader programs illustrated in FIG. 4, the driver 122 can also generate a fetch shader program for the vertex shader program 402 to be executed at the vertex shader stage 304 of the graphics processing pipeline 134. This fetch shader program is separate from the fetch shader program 420 illustrated in FIG. 4. More specifically, the driver 122 generates a fetch shader program that fetches data from the ring buffers to which the cull shader program 410 outputs the culled primitives in the write ring buffers instruction 418. This allows the vertex shader stage 304 to receive and thus process only those primitives that the cull shader program 410 has not culled.

When automatically generating the shader programs described with respect to FIG. 4, the driver 122 generates one set of automatically generated shader programs for each different vertex shader program specified by an application 126 (or other software). Whenever the driver 122 loads a different vertex shader program for execution at the vertex shader stage 304, the driver 122 would also load the corresponding set of automatically generated shader programs for execution at the pre-processing compute shader stage 330. Generating one set of automatically generated shader programs for each different vertex shader program allows for culling of primitives based on the transforms included in the currently-executing vertex shader program.

After generating any particular set of automatically generated shader programs, the driver 122 checks that set against other previously automatically generated shader programs to determine whether any duplicate shader programs exist. If duplicates exist, the driver 122 stores only one copy.

Figure 5:
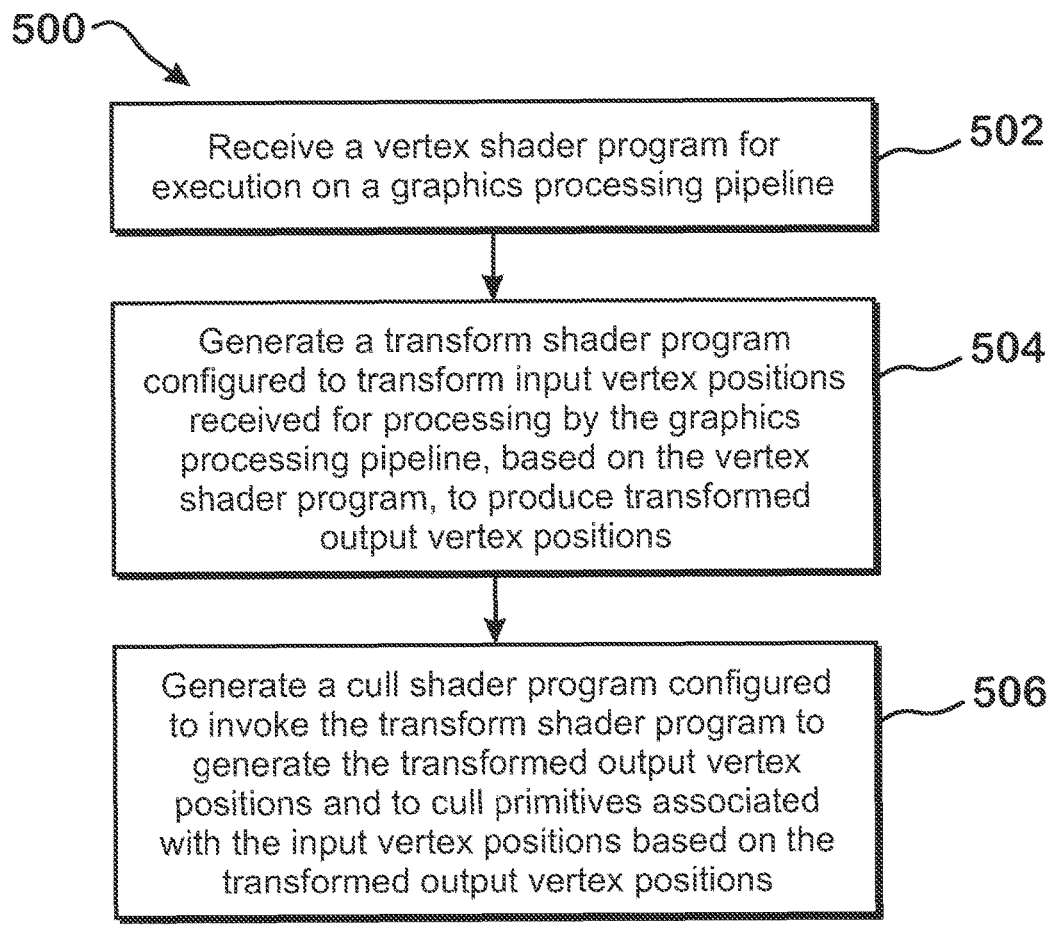
FIG. 5 is a flow diagram of a method for automatically generating shader programs to cull primitives for processing by a graphics processing pipeline.

FIG. 5 is a flow diagram of a method for automatically generating shader programs to cull primitives for processing by a graphics processing pipeline. Although described with respect to the system shown and described with respect to FIGS. 1-4, it should be understood that any system configured to perform the method, in any technically feasible order, falls within the scope of the present disclosure.

As shown, a method 500 begins at step 502, where a driver 122 receives a vertex shader program for execution on a graphics processing pipeline 134. The vertex shader program is specified by an application, included within applications 126 stored in system memory 104, for execution during the vertex shader stage 304 of the graphics processing pipeline 134.

At step 504, the driver 122 generates a transform shader program that is configured to transform input vertex positions received for processing by the graphics processing pipeline to produce output vertex positions. The driver 122 generates the transform shader program based on the received vertex shader program. For example, the driver 122 removes instructions that are related only to non-position attribute transforms. The driver 122 removes such instructions by marking output of the vertex shader program that is not related to transformed vertex positions as dead code and then performing dead code elimination on the remainder of the vertex shader program.

At step 502, the driver 122 also generates a fetch shader program. The purpose of the fetch shader program is to fetch vertex data from buffers into which that vertex data is placed by, for example, the processor 102 (at the request of an executing application 126, for example), and to place that vertex data into registers accessible to processing units (such as the SIMD units 138) of the accelerated processing device 116. The reason that the fetch shader program may be separate from the transform shader program is that the buffers into which the vertex data is placed may change places in memory and may change layout. Thus the driver 122 can update the instructions of the fetch shader program 420 on the fly in response to such buffer alterations.

At step 506, the driver 122 generates a cull shader program that is configured to invoke the transform shader program to generate the transformed output vertex positions and to cull primitives associated with the input vertex positions based on the transformed output vertex positions. The cull shader program is configured to execute first and is configured to invoke the transform shader program. The cull shader may be configured to invoke the transform shader program "through" the fetch shader program. More specifically, the cull shader program invokes the fetch shader program, which is configured to fetch the vertex data into the above mentioned registers and then invoke the transform shader program. In such a situation, the cull shader program invokes the transform shader program "indirectly," through the fetch shader program.

Because the transform shader program is configured to return execution to the cull shader program after producing the transformed output vertex positions, the cull shader program is configured to cull primitives based on the transformed output vertex positions after invoking the transform shader program. The cull shader program is also configured to write the results of the culling operations into one or more buffers to be read by the vertex shader stage 304 of the graphics processing pipeline 134 while the graphics processing pipeline 134 is processing primitives for rendering.

Figure 6:
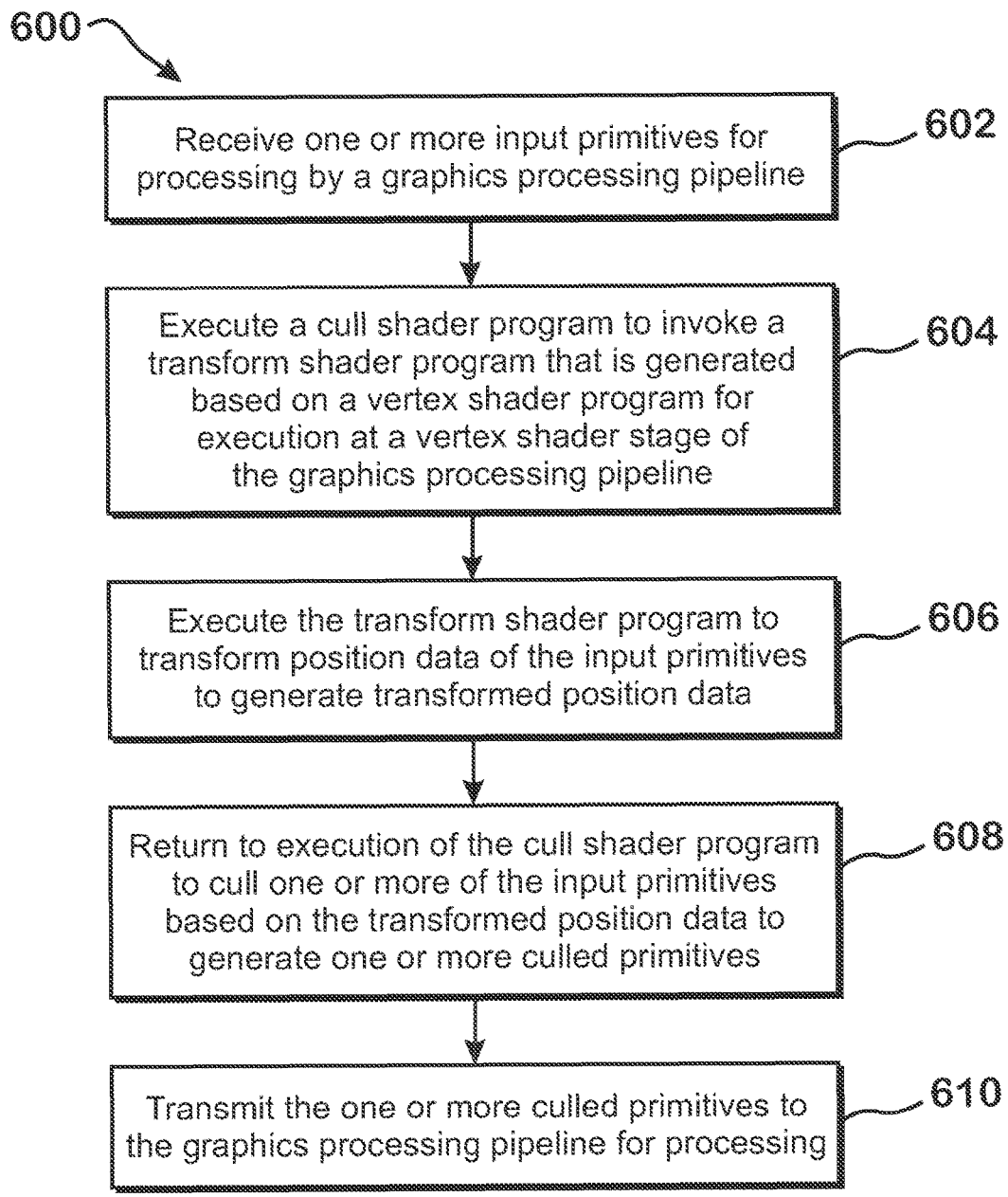
FIG. 6 is a flow diagram of a method for executing automatically generated shader programs for culling primitives for processing by a graphics processing pipeline.

FIG. 6 is a flow diagram of a method for executing automatically generated shader programs for culling primitives for processing by a graphics processing pipeline. Although described with respect to the system shown and described with respect to FIGS. 1-4, it should be understood that any system configured to perform the method, in any technically feasible order, falls within the scope of the present disclosure.

As shown, a method 600 begins at step 602, wherein an accelerated processing device 116 receives one or more primitives for processing by the graphics processing pipeline 134. The one or more primitives include one or more vertices that define the primitives, and each of the vertices include position attributes that define shape and position of the primitives as well as non-position attributes that define aspects of the primitives related to lighting, texture, color, or other aspects.

At step 604, the accelerated processing device 116 executes a cull shader program to process the received primitives. The cull shader program is configured to invoke a transform shader program that is generated based on a vertex shader program for execution at a vertex shader stage of the graphics processing pipeline 134. At step 606, the accelerated processing device 116 executes the transform shader program to transform position data associated with the input primitives to generate transformed position data. As described above, the transform shader program is generated based on the vertex shader program and includes instructions specified by the vertex shader program that are configured to transform the position data.

At step 608, the accelerated processing device 116 returns to execution of the cull shader program (as instructed by the transform shader program) and culls one or more of the input primitives based on the transformed position data generated by the transform shader program, to generate one or more culled primitives, if any. As stated above, instructions for culling are well-known to those of skill in the art, and such instructions implement one or more of back-face culling, occlusion culling, frustum culling, small primitive culling, and/or other culling techniques.

At step 610, the accelerated processing device 116 transmits the one or more culled primitives to the graphics processing pipeline 134 for processing. This transmission is accomplished by writing the one or more culled primitives to a buffer designated to be read by some initial stage of the graphics processing pipeline 134 such as the input assembler stage 302. A customized fetch shader for the vertex shader stage 304 of the graphics processing pipeline 134 may exist and may be configured to read from the buffer that stores the culled primitives, instead of the buffer that stores the primitives that are input to and read by the cull shader program.

Note that the above discussion contemplates automatic generation of shader programs based on the vertex shader program for use at the vertex shader stage 304 of the graphics processing pipeline. In some alternatives, however, the driver 122 may automatically generate the above shader programs based on fixed-function vertex shader operations that are hard-coded into the graphics processing pipeline 134. To do this, the driver 122 would select only those operations of such fixed-function shader that transform vertex positions and include those operations into a cull shader program, optional fetch shader program, and transform shader program as described above.

The techniques described herein improve the efficiency of graphics processing pipelines by culling primitives received for rendering before sending those primitives to the graphics processing pipeline for rendering. Further, the culling technique makes use of a transform shader program that is automatically generated based on a vertex shader program to be executed as part of the graphics processing pipeline. Basing the transform shader program on the vertex shader program allows culling to be done based on customized vertex position transforms that can be defined by a programmer. Further, because the cull shader program and transform shader program are automatically generated, a programmer does not need to explicitly invoke primitive culling operations, which simplifies the application development process and reduces cost and time for development of software that utilizes the graphics processing pipeline.

One advantage of the generated shader programs is that each such shader program can process multiple vertices at the same time. When executed on a highly parallel architecture such as the one described with respect to FIG. 2, each instance (e.g., each work-item) of the shader program can process multiple vertices.

Although the vertex shader program that executes at the vertex shader stage 304 of the graphics processing pipeline 134 is described as not being modified herein, in one alternative, the vertex shader stage 304 is modified to use the transformed vertices from the generated shaders executed at the compute stage instead of re-computing the transforms for those vertices. The vertex shader program would still compute transforms for non-position attributes. The driver 122 could use dead code elimination to remove instructions that only contribute to position transforms and could also modify the vertex shader programs to simply pass through the already transformed vertex positions, accepting such transformed positions as input and transmitting the transformed vertex positions out as output.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for automatic generation of shader programs for culling primitives to be provided to a vertex shader stage of a graphics processing pipeline of an accelerated processing device, the method comprising:
   receiving a vertex shader program for execution as part of the graphics processing pipeline;
   generating a transform shader program based on the vertex shader program, the transform shader program including vertex position transform instructions derived from the vertex shader program, the vertex position transform instructions configured to transform input vertex positions of input vertices received for processing on the graphics processing pipeline to produce transformed output vertex positions; and
   generating a cull shader program configured to invoke the transform shader program, to cull primitives corresponding to the transformed output vertex positions to produce culled primitives, and to output the culled primitives for use by the vertex shader stage of the graphics processing pipeline.

2. The method of claim 1, further comprising:
   generating a first fetch shader program that is configured to fetch vertex data from a buffer and to place the fetched vertex data into registers for use by the transform shader program and the cull shader program.

3. The method of claim 2, wherein the cull shader program is configured to invoke the transform shader program by invoking the first fetch shader program, which is configured to invoke the transform shader program.

4. The method of claim 2, wherein the transform shader program is generated before the first fetch shader program and the cull shader program and the first fetch shader program is generated before the cull shader program.

5. The method of claim 1, further comprising:
generating a second fetch shader configured to fetch culled vertex data corresponding to the culled primitives, instead of corresponding to the input vertices received for processing on the graphics pipeline, and to provide the culled vertex to the vertex shader stage of the graphics processing pipeline.

6. The method of claim 1, wherein generating the transform shader program based on the vertex shader program comprises removing instructions that do not contribute to transformed position output from the vertex shader program.

7. The method of claim 6, wherein removing the instructions that do not contribute to the transformed positions comprises marking output instructions that output non-position attribute outputs as dead code and then performing dead code elimination on the vertex shader program.

8. The method of claim 1, wherein the cull shader program is configured to cull the primitives via one or more of a back face culling technique, a view frustum culling technique, a small primitive culling technique, and an occlusion culling technique.

9. The method of claim 1, further comprising:
transmitting the transform shader program and the cull shader program to the accelerated processing device for execution to process primitives transmitted to the graphics processing pipeline for rendering and display to an output display device.

10. A non-transitory computer-readable medium storing instructions that, when executed by a processor, cause the processor to perform a method for automatic generation of shader programs for culling primitives to be provided to a vertex shader stage of a graphics processing pipeline of an accelerated processing device, the method comprising:
receiving a vertex shader program for execution as part of the graphics processing pipeline;
generating a transform shader program based on the vertex shader program, the transform shader program including vertex position transform instructions derived from the vertex shader program, the vertex position transform instructions configured to transform input vertex positions of input vertices received for processing on the graphics processing pipeline to produce transformed output vertex positions; and
generating a cull shader program configured to invoke the transform shader program, to cull primitives corresponding to the transformed output vertex positions to produce culled primitives, and to output the culled primitives for use by the vertex shader stage of the graphics processing pipeline.

11. The non-transitory computer-readable medium of claim 10, wherein the method further comprises:
generating a first fetch shader program that is configured to fetch vertex data from a buffer and to place the fetched vertex data into registers for use by the transform shader program and the cull shader program.

12. The non-transitory computer-readable medium of claim 11, wherein the cull shader program is configured to invoke the transform shader program by invoking the first fetch shader program, which is configured to invoke the transform shader program.

13. The non-transitory computer-readable medium of claim 11, wherein the transform shader program is generated before the first fetch shader program and the cull shader program and the first fetch shader program is generated before the cull shader program.

14. The non-transitory computer-readable medium of claim 10, wherein the method further comprises:
generating a second fetch shader configured to fetch culled vertex data corresponding to the culled primitives, instead of corresponding to the input vertices received for processing on the graphics pipeline, and to provide the culled vertex to the vertex shader stage of the graphics processing pipeline.

15. The non-transitory computer-readable medium of claim 10, wherein generating the transform shader program based on the vertex shader program comprises removing instructions that do not contribute to transformed position output from the vertex shader program.

16. The non-transitory computer-readable medium of claim 15, wherein removing the instructions that do not contribute to the transformed positions comprises marking output instructions that output non-position attribute outputs as dead code and then performing dead code elimination on the vertex shader program.

17. The non-transitory computer-readable medium of claim 10, wherein the cull shader program is configured to cull the primitives via one or more of a back face culling technique, a view frustum culling technique, a small primitive culling technique, and an occlusion culling technique.

18. The non-transitory computer-readable medium of claim 10, wherein the method further comprises:
transmitting the transform shader program and the cull shader program to the accelerated processing device for execution to process primitives transmitted to the graphics processing pipeline for rendering and display to an output display device.

19. A method for culling input primitives for processing by a graphics processing pipeline of an accelerated processing device, the method comprising:
receiving one or more of the input primitives;
executing a cull shader program to invoke a transform shader program that is generated based on a vertex shader program for execution at a vertex shader stage of the graphics processing pipeline;
executing the transform shader program to transform position data of the input primitives to generate transformed position data;
returning to execution of the cull shader program to cull one or more of the input primitives based on the transformed position data to generate one or more culled primitives; and
transmitting the one or more culled primitives to the graphics processing pipeline for processing.

20. The method of claim 19, further comprising:
executing a first fetch shader program to fetch vertex data for the input primitives and to place the fetched vertex data into registers for use by the transform shader program.

* * * * *